J. A. HAGERSTROM.
CARRIAGE TRUCK.
APPLICATION FILED SEPT. 29, 1917.
1,315,490.
Patented Sept. 9, 1919.
2 SHEETS—SHEET 2.
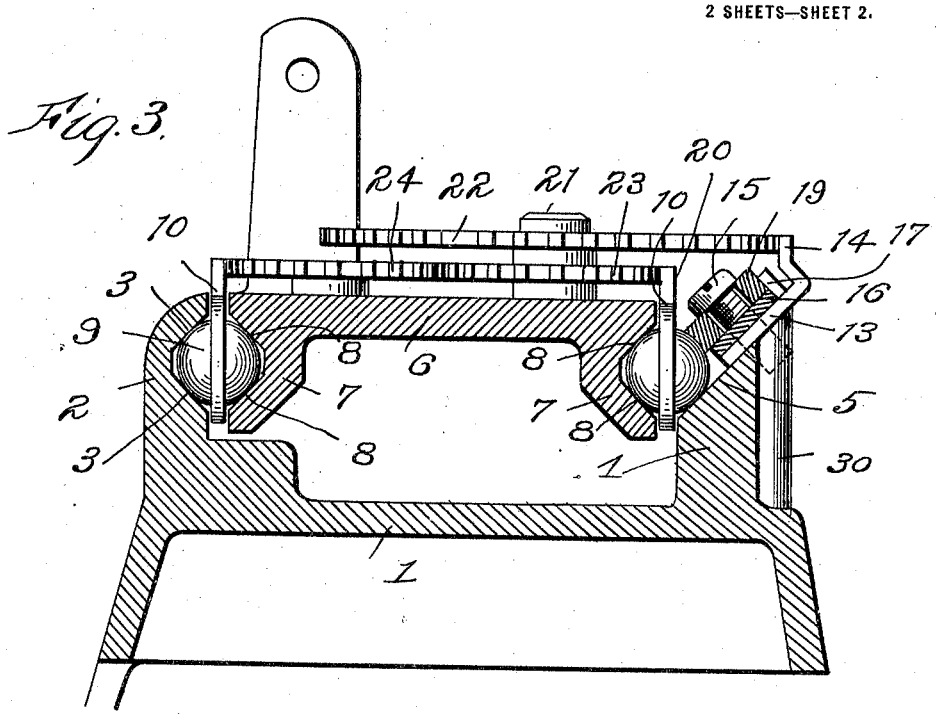
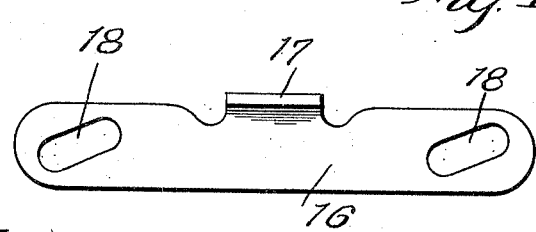
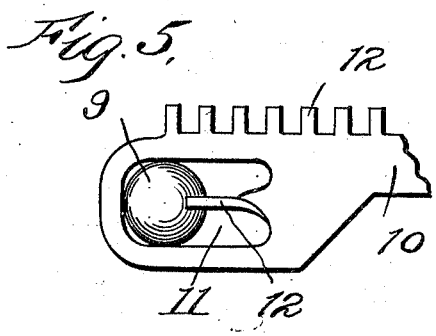
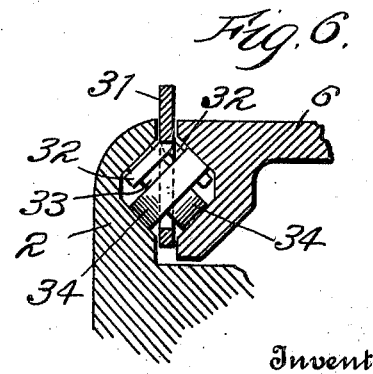
Inventor
John A. Hagerstrom
By his Attorneys
Knight Bros

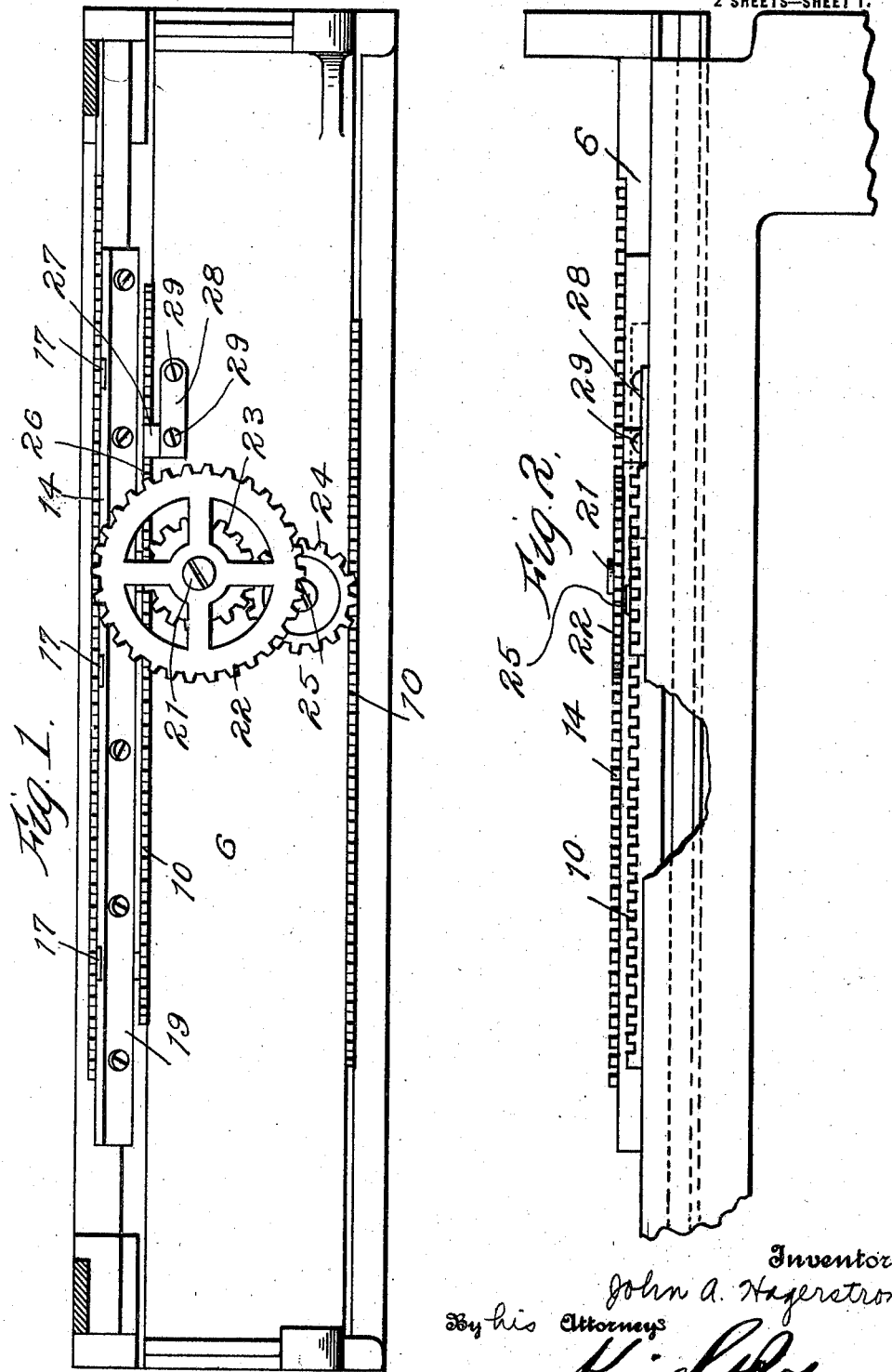

UNITED STATES PATENT OFFICE.

JOHN A. HAGERSTROM, OF SCRANTON, PENNSYLVANIA, ASSIGNOR TO VICTOR TYPEWRITER COMPANY, OF SCRANTON, PENNSYLVANIA, A CORPORATION OF NEW YORK.

CARRIAGE-TRUCK.

1,315,490.      Specification of Letters Patent.      Patented Sept. 9, 1919.

Application filed September 29, 1917. Serial No. 194,078.

*To all whom it may concern:*

Be it known that I, JOHN A. HAGERSTROM, a citizen of the United States, residing at Scranton, in the county of Lackawanna and State of Pennsylvania, have invented certain new and useful Improvements in Carriage-Trucks, of which the following is a specification.

This invention relates to typewriting machines and has for its primary object to provide improved means for mounting the carriage-supporting truck of a typewriter. One of the objects of my invention is to provide improved means for adjusting the relative relations between the parts of the bearings which serve to reciprocably mount the carriage-supporting truck on the typewriter frame. Another object of this invention is to provide an improved ball separator for carriage truck bearings. Other and further objects will appear in the specification and be pointed out in the appended claims, reference being had to the accompanying drawings, In the drawings.—

Figure 1 is a top plan view of a typewriter truck embodying my improvement;

Fig. 2 is a front elevation of the same, parts being broken away;

Fig. 3 is a transverse section of the same on an enlarged scale, parts being shown in elevation;

Fig 4 is a plan view of the ball track gib adjusting plate;

Fig. 5 is a fragmentary plan view of one end of one of the ball separators;

Fig. 6 is a fragmentary transverse section of a modified form of the truck bearing.

Referring more particularly to the drawings, the typewriter frame 1 is provided with a longitudinal guide or rail 2. Formed in said guide or rail 2 are a pair of angularly disposed tracks or guide surfaces 3. Said frame 1 is also provided with a second guide or rail 4 which is oppositely disposed with respect to the guide or rail 2, and is provided with a beveled guide surface 5. A truck 6 is provided with guides or rails 7 along opposite longitudinal edges thereof, each of said guides or rails 7 being provided with beveled bearing surfaces 8. According to the left side of Fig. 3, the angularly disposed bearing surfaces 8 are oppositely presented with respect to the bearing surfaces or tracks 3, respectively. Interposed between the bearing surfaces 3—3, 8—8, are a plurality of bearing balls 9. According to Fig. 5 of the drawings, one of the balls 9 is mounted within each end of a ball separator or plate 10. For this purpose, said plate or separator 10 is provided at either end with an opening 11 which accommodates the ball 9, said opening being partially provided by stamping a portion 12 of said separator or plate into the form of a fork which is adapted to retain the ball 9 in the position shown in Fig. 5. Each of the plates or separators 10 is provided along its upper edge with a rack 12. Referring more especially to the right hand portion of Fig. 3, a plate 13 is laid upon the beveled surface 5. Said plate 13 is provided with an upwardly presented rack 14. A plurality of screws or studs 15 pass through holes in the plate or rack bar 13 and hold it in position along with other parts now to be referred to. Slidably mounted upon the upper surface of the plate 13 is a ball track gib plate 16 which is provided above with an upwardly and laterally projecting flange or lug 17. As shown in Fig. 4, the gib adjusting plate 16 is provided adjacent opposite ends with obliquely arranged slots 18. Mounted upon the plate 16 and laterally contacting therewith is a ball track 19 which is provided with a plurality of holes or openings 20 of larger diameter than the shanks of the screws or studs 15. By this means, the ball track 19 is adapted to be adjusted toward and away from the ball 9. In order to accurately and easily obtain this adjustment, the lug or flange 17 serves as a finger hold for adjusting the gib adjusting plate 16 lenghtwise which, by means of the inclined slots 18 serves to adjust the lug or flange 17 toward or away from the ball 9. At the same time, the lug or flange 17 serves to limit the position of the ball track 19. In the preferred embodiment of my invention, there are three of the gib adjusting plates 16 arranged end to end but spaced apart along the typewriter frame. By an inspection of Fig. 1, it will be seen therefore, that the track bar 19 may be adjusted toward and away from the ball 9 as a whole or else one end of the track bar may be adjusted inwardly or outwardly relatively to the other end of said bar. Referring now to Figs. 1 and 3, the truck 6 carries a screw or stud 21 upon which is journaled a gear wheel 22 which meshes with the upwardly presented rack 14 on the plate 13 Whenever the gear wheel 22 is rotated, its movement is imparted to a second gear wheel 23 which is coaxial therewith on the stud 21. As shown in Fig. 3, the gear wheel 23 meshes with the rack 12 on one of the ball separators 10. Another gear wheel 24 which receives its motion from the gear wheel 23, is journaled on a screw or stud 25 which is also carried by the truck 6. The gear wheel 24 is geared to the rack carried by the separator 10 at the left of Fig. 3. From this description, it will be understood that as the carriage truck 6 is reciprocated to and fro on the typewriter frame, the gear wheel 22 will be rotated by reason of its engagement with the rack 14, and by imparting its rotary movement to the gear 23 and through said gear 23 to the gear 24, will cause the ball separators 10 along opposite edges of the truck 6 to be moved to and fro in such a way as to maintain a proper spacing of the balls on either side of the truck. A plate 26 is in slidable engagement with the rack 12 adjacent its engagement with the gear wheel 23. For this purpose, the plate 26 is carried by an offset 27 which is mounted on a plate 28 which is secured to the truck 26 by means of studs or screws 29. The advantages accruing to my invention will now be readily understood and briefly explained are as follows:

Whenever is is desired to take up play in the bearings of the truck 6, the ball track 19 may be adjusted laterally by loosening the screws or studs 15 throughout its length. Then as said truck 6 is reciprocated on its sides, the lugs 17 of the gib adjusting plates 16 may be moved lengthwise of the carriage, either together to bring the ball track 19 as a whole closer to the ball 9, or one end of said track may be moved inwardly relatively to the other end of said track. During these adjustments, the ball track 19 presses normally against the ball 9 in a plane which includes the centers of said balls. It will be readily understood that by means of the cam slots 18 in either end of each gib adjusting plate 16, this adjustment is rendered more delicate and better parallelism in the track bar is maintained. It will be seen that as the balls 9 on the right hand according to Fig. 3, are adjusted upwardly or downwardly along the beveled surface 5, the pressure will be automatically equalized between the bearing surfaces 8—8, bearing surface 5 and track bar 19, while at the same time, the bearing pressure between the bearing surfaces 3—3 and 8—8 on the left hand of Fig. 3 will be equalized in the same manner. The rear rail or guide 4 of the typewriter frame is provided with vertically arranged beams or reënforcements 30 which materially aid in supporting the upper edges of the rack bar 13, and at the same time furnish more metal for the reception of the screws or studs 15. Referring now to Fig. 6, the construction of the truck 6 and of the guide or rail 2 of the typewriter frame, is exactly the same as in the other embodiments of my invention. According to this figure, however, each of the ball separators 31 is provided with laterally displaced bearing lugs 32 which carry studs 33 upon which are journaled the bearing rollers 34. The opening at each end of the separator 31 is partly obtained by the space left by the lugs 32 when pressed from the sheet metal.

I claim:

1. In a typewriter, the combination of a carriage provided with bearing surfaces angularly disposed with respect to each other, a frame for reciprocably mounting said carriage, said frame being provided with a bearing surface parallel to one of said angularly disposed bearing surfaces of the carriage, anti-friction elements disposed between said bearing surfaces on the carriage and said bearing surface on the frame, and means adjustable over said bearing surface of the frame for adjusting the amount of slack between said anti-friction element and bearing surfaces.

2. In a typewriter the combination with a carriage provided with a bearing groove comprising bearing surfaces angularly disposed with respect to each other, of a frame provided with a bearing surface parallel to one of the bearing surfaces on said carriage, a track bar having a bearing surface disposed opposite to the other bearing surface on said carriage, and at an angle to said bearing surface on the frame, means interposed between said track bar and bearing surface on the frame for adjusting said track bar and anti-friction elements arranged between said track bar and said bearing surfaces.

3. In a typewriter, the combination with a carriage provided with a bearing groove comprising bearing surfaces angularly disposed with respect to each other, of a frame provided with a bearing surface parallel to one of the bearing surfaces on said carriage, a track bar having a bearing surface disposed opposite to the other bearing surface on said carriage, means interposed between said track bar and bearing surface on the frame for adjusting said track bar and anti-friction elements arranged between said track bar and said bearing surfaces, said adjusting means including a plate interengaging with said track bar and slidably mounted on said frame.

4. In a typewriter, the combination with a carriage provided with a bearing groove comprising bearing surfaces angularly disposed with respect to each other, of a frame provided with a bearing surface parallel to one of the bearing surfaces on said carriage, a track bar having a bearing surface disposed opposite to the other bearing surface on said carriage, means interposed between said track bar and bearing surface on the frame for adjusting said track bar and anti-friction elements arranged between said track bar and said bearing surfaces, said adjusting means including a plate for holding said track bar in bearing engagement with said antifriction elements, said plate being adapted to maintain said track bar in substantial parallelism in its different adjusted positions.

5. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar.

6. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said adjusting means including a plate slidably mounted on said frame and in engagement with said bar.

7. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said adjusting means including a cam plate slidably mounted on said frame and having means for holding said bar parallel to the groove in said carriage with which it coöperates.

8. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said adjusting means including screws or studs spaced longitudinally of said frame, and a plate provided with cam-grooves bearing on said screws or studs, said plate being provided with lugs engaging said bar.

9. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said frame being provided with an inclined bearing surface for movably engaging said anti-friction elements, studs or screws threaded into said frame normal to said surface, and a bearing bar adjustably secured by said screws or studs.

10. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said frame being provided with an inclined bearing surface for supporting said anti-friction elements, screws or studs spaced longitudinally of said bearing surface, a plate slidably mounted in the plane of said bearing surface and having cam slots coöperating with said studs for moving said plate in parallelism toward and away from said anti-friction elements, and a bearing bar engaged by said plate and adapted to have its position determined by the movement of said plate.

11. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said frame being provided with an inclined bearing surface for supporting said anti-friction elements, screws or studs spaced longitudinally of said bearing surface and having cam slots coöperating with said studs for moving said plate in parallelism toward and away from said anti-friction elements, and a bearing bar engaged by said plate and adapted to have its position determined by the movement of said plate, said plate being provided with a lug for gaging the upper edge of said bearing bar.

12. In a typewriter, a reciprocable carriage provided with oppositely presented grooves, each with angularly disposed bearing surfaces, a frame for slidably supporting said carriage, anti-friction elements interposed between said frame and carriage, a longitudinal bar bearing edgewise on said anti-friction elements, and means for adjusting the position of said bar, said frame being provided with an inclined bearing surface for supporting said anti-friction elements, screws or studs spaced longitudinally of said bearing surface, a plate slidably mounted in the plane of said bearing surface, and having cam slots coöperating with said studs for moving said plate in parallelism toward and away from said anti-friction elements, a bearing bar engaged by said plate and adapted to have its position determined by the movement of said plate, and a rack clamped to said frame in approximately the plane of said bearing surface.

13. In a typewriter, a reciprocable carriage, having bearing surfaces at right angles to each other, a frame provided with a bearing surface parallel to one of said bearing surfaces, a rack bar secured to said frame on a continuation of its bearing surface, a bearing bar adjustably mounted on said rack bar, and anti-friction elements mounted between said bearing surfaces and said bearing bar.

14. In a typewriter, a reciprocable carriage, having bearing surfaces at right angles to each other, a frame provided with a bearing surface parallel to one of said bearing surfaces, a rack bar secured to said frame on a continuation of its bearing surface, a bearing bar adjustably mounted on said rack bar, and anti-friction elements mounted between said bearing surfaces and said bearing bar, said rack bar having its toothed portion deflected over and above said bearing bar.

15. In a typewriter, a reciprocable carriage having bearing surfaces at right angles to each other, a frame provided with a bearing surface parallel to one of said bearing surfaces, a rack bar secured to said frame on a continuation of its bearing surface, a bearing bar adjustably mounted on said rack bar, and anti-friction elements mounted between said bearing surfaces and said bearing bar, said frame being provided with cam plates arranged longitudinally of its bearing surface and in engagement with said bearing bar.

JOHN A. HAGERSTROM.

Witnesses:
MARY C. ROCHE,
EDNA J. GEISS.

Copies of this patent may be obtained for five cents each, by addressing the "Commissioner of Patents, Washington, D. C."